(12) United States Patent
Wang

(10) Patent No.: US 9,341,057 B2
(45) Date of Patent: May 17, 2016

(54) APPARATUS AND METHOD OF DISTRIBUTED PRESSURE SENSING

(71) Applicant: Halliburton Energy Services, Inc., Houston, TX (US)

(72) Inventor: Yunmiao Wang, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 330 days.

(21) Appl. No.: 13/945,443

(22) Filed: Jul. 18, 2013

(65) Prior Publication Data

US 2015/0020598 A1 Jan. 22, 2015

(51) Int. Cl.
G01L 9/02 (2006.01)
E21B 47/06 (2012.01)
G01L 1/24 (2006.01)
G01L 11/02 (2006.01)
E21B 47/12 (2012.01)

(52) U.S. Cl.
CPC ............... *E21B 47/06* (2013.01); *E21B 47/123* (2013.01); *G01L 1/246* (2013.01); *G01L 11/025* (2013.01)

(58) Field of Classification Search
None
See application file for complete search history.

(56) References Cited

U.S. PATENT DOCUMENTS

| | | | |
|---|---|---|---|
| 6,072,567 A | 6/2000 | Sapack | |
| 8,477,296 B2 * | 7/2013 | Donlagic et al. | 356/73.1 |
| 8,727,613 B2 * | 5/2014 | Mihailov | 374/131 |
| 8,797,540 B2 * | 8/2014 | Digonnet et al. | 356/477 |
| 8,879,067 B2 * | 11/2014 | Higgins et al. | 356/450 |
| 9,019,482 B2 * | 4/2015 | Digonnet et al. | 356/35.5 |
| 2004/0042703 A1 | 3/2004 | Deaton | |
| 2008/0247273 A1 | 10/2008 | Chemali et al. | |
| 2013/0113629 A1 | 5/2013 | Hartog et al. | |
| 2014/0139841 A1 * | 5/2014 | Koste et al. | 356/477 |
| 2014/0211202 A1 * | 7/2014 | Niewczas et al. | 356/73.1 |
| 2015/0144773 A1 * | 5/2015 | Buck et al. | 250/227.18 |

FOREIGN PATENT DOCUMENTS

EP 1040330 A1 10/2000
EP 2259037 A2 12/2010

OTHER PUBLICATIONS

International Application Serial No. PCT/US2014/042990, International Search Report mailed Sep. 29, 2014, 3 pgs.
International Application Serial No. PCT/US2014/042990, Written Opinion mailed Sep. 29, 2014, 4 pgs.
Digonnet, M., et al., "Slow light in fiber sensors", Proc. SPIE 8273, Advances in Slow and Fast Light V, (Feb. 9, 2012), 82730W.
Wen, He, et al., "Sensing With Slow Light in Fiber Bragg Gratings", IEEE Sensors Journal, 12(1), (Jan. 2012), 156-163.

* cited by examiner

*Primary Examiner* — Peter Macchiarolo
*Assistant Examiner* — Jermaine Jenkins
(74) *Attorney, Agent, or Firm* — Schwegman Lundberg & Woessner, P.A.; John W. Wustenberg

(57) ABSTRACT

Various embodiments include apparatus and methods to measure pressure using an optical fiber. The optical fiber can be structured with fiber Bragg gratings arranged along the optical fiber. Optical signals can be transmitted through the optical fiber, where the optical signals have a wavelength of a slow-light peak of a respective one of the fiber Bragg gratings. Signals resulting from the optical signals transmitted through the optical fiber can be detected and a value of pressure from the detected signals can be determined.

20 Claims, 7 Drawing Sheets

APPARATUS AND METHOD OF DISTRIBUTED PRESSURE SENSING

TECHNICAL FIELD

The present invention relates generally to apparatus for making measurements related to oil and gas exploration.

BACKGROUND

In drilling wells for oil and gas exploration, understanding the structure and properties of the associated geological formation provides information to aid such exploration. It is important to monitor the physical conditions inside the wellbore of an oil well, in order to ensure proper operation of the well. Dynamic wellbore conditions to be monitored during production can include, but are not limited to, pressure, temperature, and strain. In the wellbore, the liquid pressures can be up to 20 kpsi and the temperatures can be up to over 300° C. Electric sensors such as, piezoelectric resistors, piezoelectric elements, and capacitive probes, are frequently used for pressure measurement typically only up to approximately 170° C. There is ongoing effort to develop systems and methods that can allow for more flexibility without significant loss of precision in systems and techniques to measure parameters downhole at a drilling site.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Fiber optic sensors are more attractive for harsh environment applications due to their distinguished advantages including good high-temperature capability, corrosion resistance, and electromagnetic insensitivity. In various embodiments, pressure measurements can be made using fiber optic distributed sensors. Fiber Bragg gratings can be utilized as sensors distributed along the length of an optical fiber. The fiber Bragg gratings can be written on the core of a polarization maintaining (PM) fiber. The PM fiber may be a side-hole PM fiber. Measurements can be made using slow light caused by the fiber Bragg gratings.

Many fiber optic sensors have been successfully deployed to measure distributed temperature and strain for wellbore monitoring application. With respect to pressure, some single-point fiber optic pressure sensors have been developed such as fiber Fabry-Perot sensors with pressure-sensitive diaphragms. However, most of these pressure sensors are single-point sensors that use complicated mechanical structures to transfer pressure change into optical change which makes multiplexing difficult. In wellbore monitoring applications, the long operation distance requires a sensing system with large area coverage. For this reason, distributed optical fiber pressure sensors, as discussed herein may reduce the cost at a single sensing point.

Figure 1:
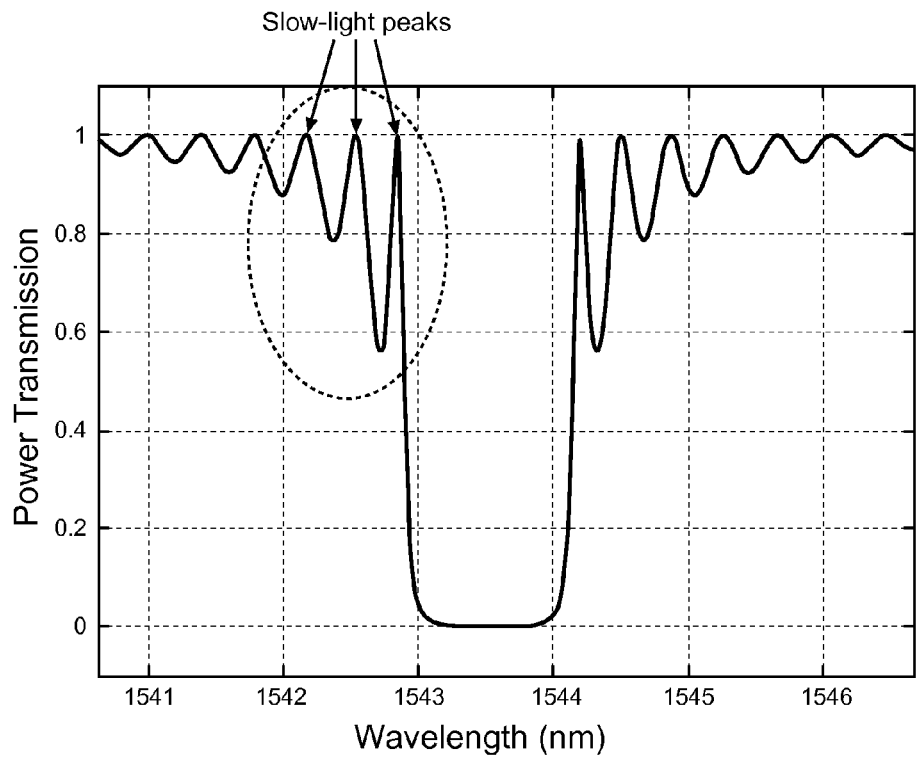
FIG. 1 shows a simulated transmission spectrum of a uniform fiber Bragg grating, in accordance with various embodiments.

A fiber Bragg grating (FBG) is a structure formed by periodically changing the refractive index of a fiber core. The transmission spectrum of an FBG has a bandgap in the wavelength domain where light has minimum transmission. On the edges of the bandgap, the light at some wavelengths interferes constructively in the forward direction and results in high transmission peaks as illustrated in FIG. 1. FIG. 1 shows a simulated transmission spectrum of a uniform FBG. In the region of these peaks, light reflects back and forth numerous times across the periodic structure and experiences a decrease in net group velocity. Light can be slowed down using one of these high transmission peaks, which are referenced to as slow-light peaks. It has been reported that a group index of 127 can be generated by an FBG corresponding to a group velocity around 2360 km/s. Further, the strain applied on an FBG can change the grating period and the mode effective index of the FBG, and further affect the decrease in group velocity of the light propagating at the slow-light wavelength. System and methods can use light at one or more slow-light wavelengths in a manner similar to or identical to the system and methods discussed herein.

Figure 2:
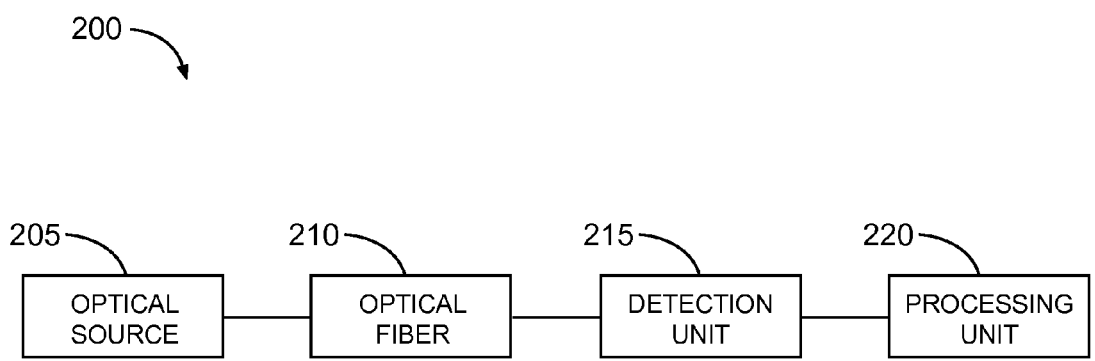
FIG. 2 shows a block diagram of an example system that can be implemented to measure pressure, in accordance with various embodiments.

FIG. 2 shows a block diagram of an embodiment of an example system 200 that can be implemented to measure pressure. System 200 includes an optical source 205, an optical fiber 210, a detection unit 215, and a processing unit 220. Distributed pressure measurements can be made along the optical fiber. For example, such distributed pressure measurements can be made underground from the surface along a wellbore.

The optical fiber 210 can be structured having a plurality of FBGs distributed along a length of the optical fiber 210. Each FBG can have a Bragg wavelength different from the other fiber Bragg gratings. Associated with each FBG is a wavelength of one or more slow-light peaks. The optical fiber 210 is a polarization-maintaining fiber. The polarization-maintaining fiber has a cladding having holes that extend along a length of the optical fiber.

The optical source 205 can be operatively coupled to the optical fiber 210 and arranged to operatively transmit optical signals through the optical fiber 210. Each of the optical signals can have an operating wavelength different from operating wavelengths of the other optical signals. Each operating wavelength of the optical signals can be at a wavelength of a slow-light peak of a respective one of the fiber Bragg gratings. For each of the fiber Bragg gratings, an operating wavelength for the respective fiber Bragg grating can be selected. In general, the operation wavelengths can be one of the slow-light peaks, which have maximum intensities in transmission spectrum, because light is not only slow in the vicinity of these wavelengths, but also has small transmission loss. However, the group velocities of light at different slow-light peaks are not the same. To achieve a high sensitivity, the wavelength in the vicinity of which the group index is largest can be selected; correspondingly the group velocity is the slowest.

The operating wavelength for an optical signal is the wavelength having the largest amplitude of the optical signal. The optical signal can include other wavelengths of amplitude less than the operating wavelength in a range extending to a wavelength limit less than the operating frequency and to a wavelength limit greater than the operating wavelength. For example, a laser can be used to provide an optical signal, where the laser generates an operating wavelength and other wavelengths, where wavelengths of significant light energy, relative to the operating wavelength, are within a linewidth of the operating wavelength. A laser source can be used having a narrow linewidth. Alternatively, a source providing a broad range of wavelengths can be used in conjunction with optical filtering techniques to provide an operating wavelength with a sufficiently narrow linewidth. The scanning range of the light source should be wide enough to cover the operating wavelengths of all the FBGs in the link. For example, the scanning range may be from 25 nm to 75 nm, or other suitable range with respect to the FBGs and sources used. The optical source 205 can include a tunable laser. The tunable laser can be selectively tuned to a wavelength of a selected slow-light peak of each respective one of the fiber Bragg gratings of the optical fiber 210 to transmit the optical signals. The tunable laser can be selectively controlled to generate the optical signals such that each optical signal is generated at a different time from the other optical signals.

The detector unit 215 can be operatively coupled to the optical fiber 210 to detect signals resulting from the optical signals transmitted through the optical fiber 210. The detector unit 215 may include a photo-detector array.

The processing unit 220 can be operatively coupled to the detector unit 215. The processing unit 220 can be arranged to determine a value of pressure from the detected signals. The determined value corresponds to pressure at a location of one of the fiber Bragg gratings. Using the plurality of optical signals, distributed pressure can be measured.

System 200 can include polarization elements between the optical source 205 and an end of the optical fiber 210 at which the optical signals are injected into the optical fiber 210. The polarization elements can be arranged to provide linear polarized light split equally into two orthogonal polarized modes. The polarization elements can include a polarization controller and an input linear polarizer. The system 200 can include an output polarizer arranged between the optical fiber 210 and the detector unit 215 to detect the beat signal of the two orthogonal polarized modes.

Figure 3:
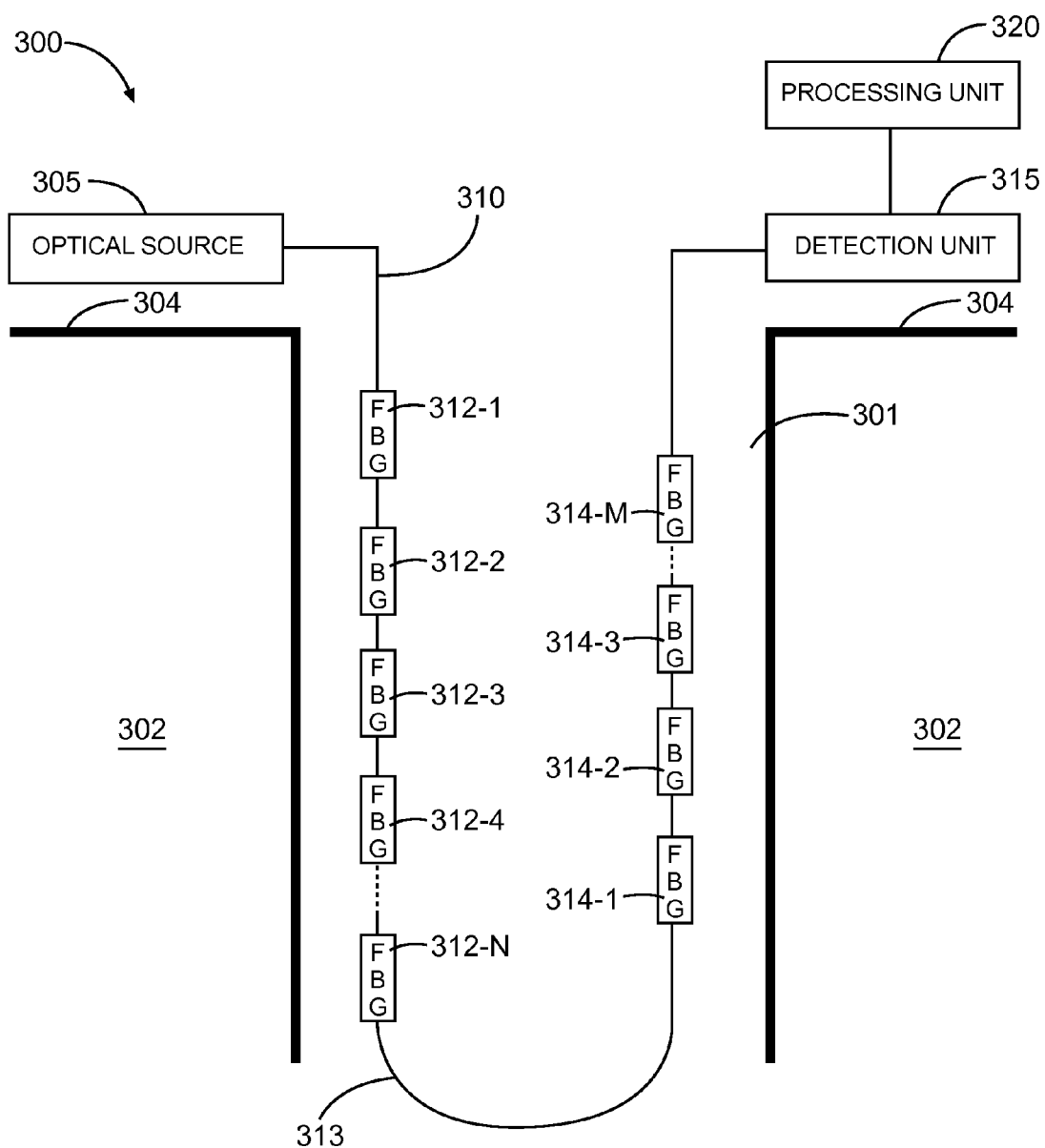
FIG. 3 shows a block diagram of an example system arranged to measure pressure in a wellbore, in accordance with various embodiments.

Systems similar to or identical to system 200 can be deployed in a wellbore in different arrangements. FIG. 3 shows a block diagram of an embodiment of an example system 300 arranged to measure pressure in a wellbore 301. System 300 can include an optical source 305, an optical fiber 310, a detection unit 315, and a processing unit 320. The optical source 305, the optical fiber 310, the detection unit 315, and the processing unit 320 can be structured to perform similar to or identical to corresponding components of system 200 of FIG. 2. As shown in FIG. 3, the system 300 is arranged with the optical fiber 310 disposed in wellbore 301 in formation 302 with the optical source 305, the detection unit 315, and the processing unit 320 on surface 304. The optical fiber 310 can be structured with FBGs 312-1 . . . 312-N distributed along the optical fiber 310 from the surface 304 to a location downhole and with FBGs 314-1 . . . 314-M distributed along the optical fiber 310 from the location downhole to the surface 304. The optical fiber 310 can be structured as a single optical fiber having FBGs 312-1 . . . 312-N and FBGs 314-1 . . . 314-M. The optical fiber 310 can be structured as multiple optical fibers with the FBGs 312-1 . . . 312-N and FBGs 314-1 . . . 314-M distributed across the multiple optical fibers. The optical fiber 310 may be structured as two fiber segments connected by an optical segment 313.

Figure 4:
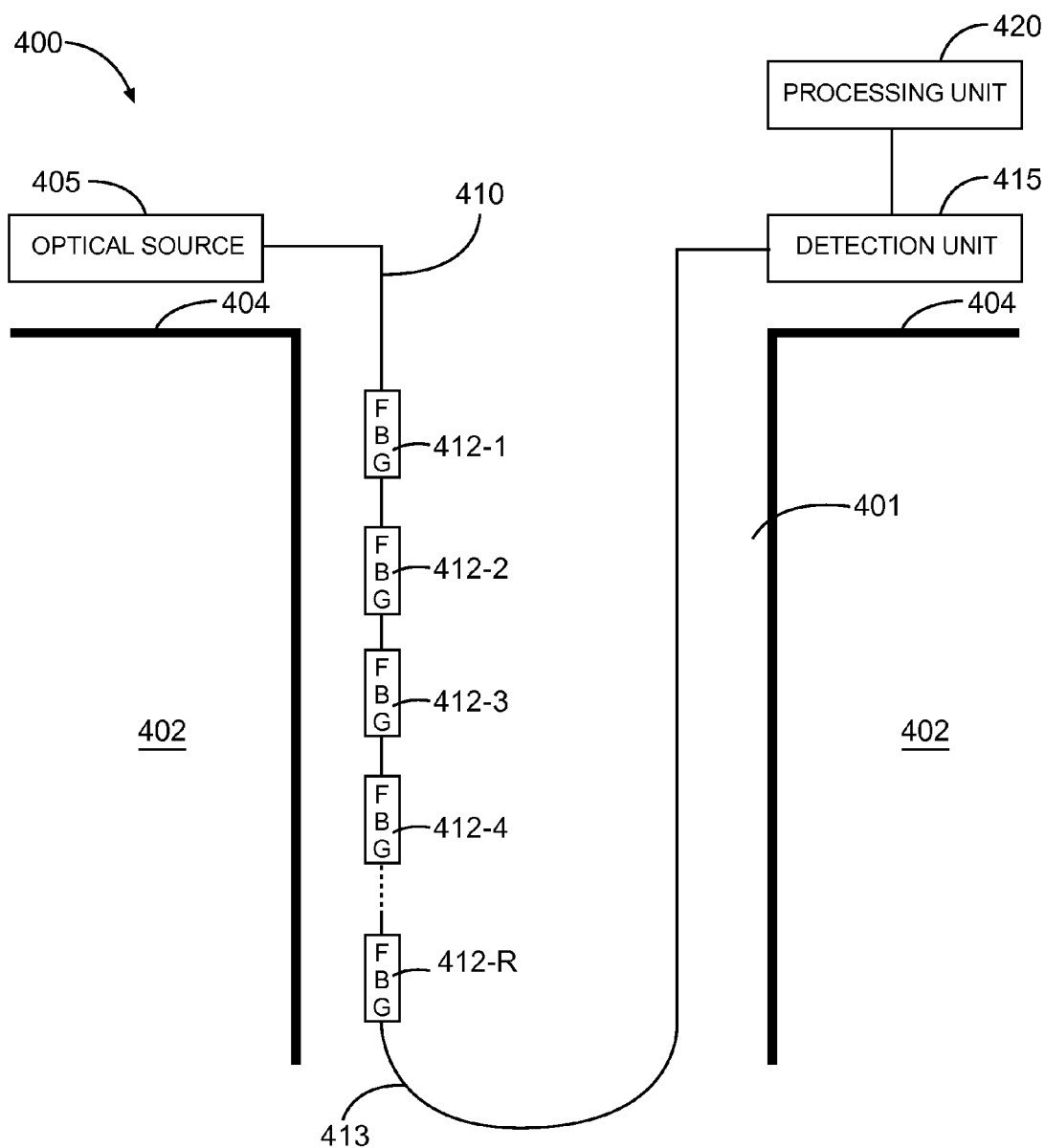
FIG. 4 shows a block diagram of an example system arranged to measure pressure in a wellbore, in accordance with various embodiments.

FIG. 4 shows a block diagram of an embodiment of an example system 400 arranged to measure pressure in a wellbore 401. System 400 can include an optical source 405, an optical fiber 410, a detection unit 415, and a processing unit 420. The optical source 405, the optical fiber 410, the detection unit 415, and the processing unit 420 can be structured to perform similar to or identical to corresponding components of system 200 of FIG. 2. As shown in FIG. 4, the system 400 is arranged with the optical fiber 410 disposed in wellbore 401 in formation 402 with the optical source 405, the detection unit 415, and the processing unit 420 on surface 404. The optical fiber 410 can be structured with FBGs 412-1 . . . 412-R distributed along the optical fiber 410 from the surface 404 to a location downhole with the optical fiber 410 extending from the location downhole back towards the surface 404. The optical fiber 410 can be structured as a single optical fiber having FBGs 412-1 . . . 412-R. The optical fiber 410 can be structured as multiple optical fibers with the FBGs 412-1 . . . 412-R distributed across the multiple optical fibers. The optical fiber 410 may be structured as two fiber segments connected by an optical segment 413.

Figure 5:
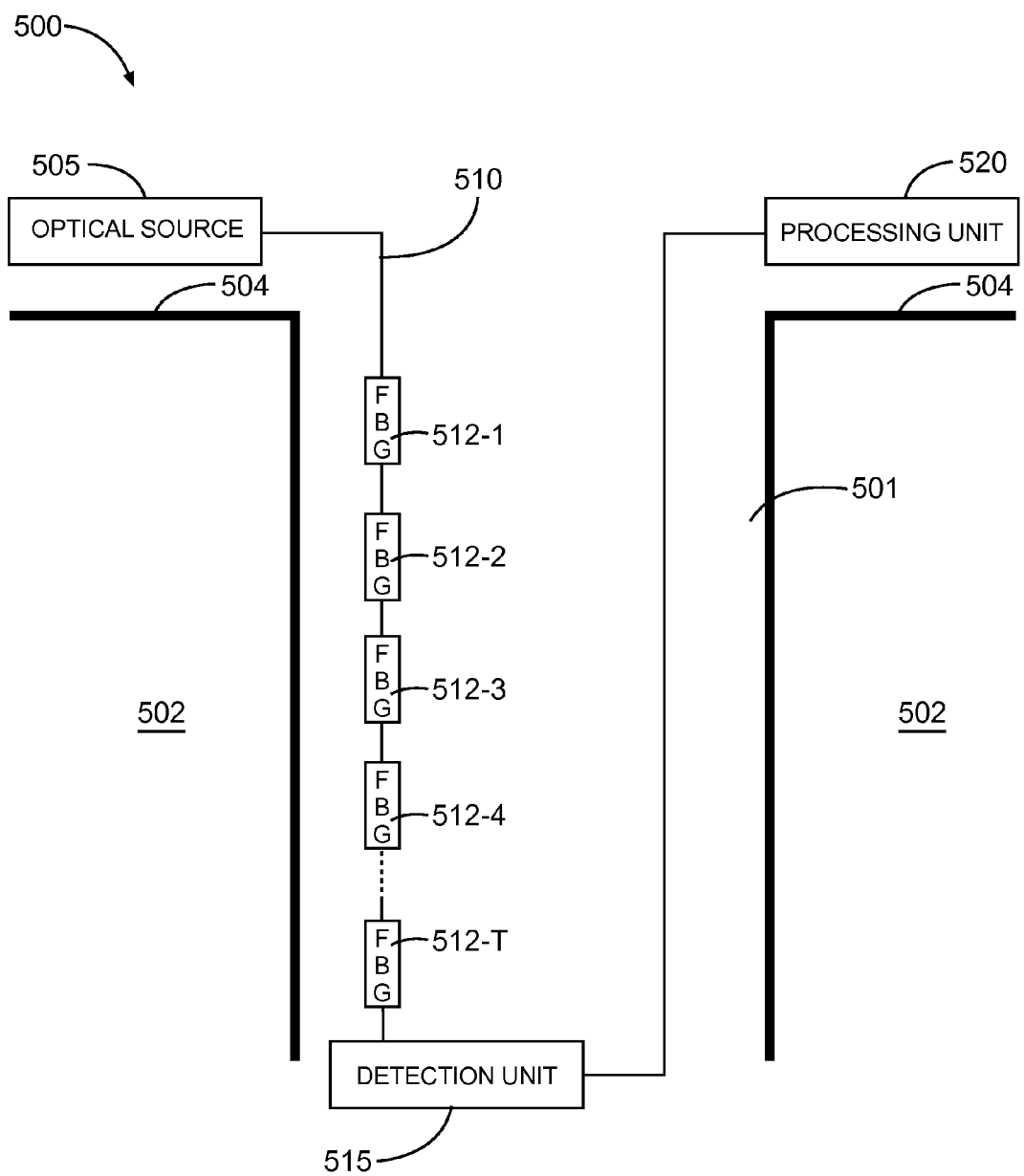
FIG. 5 shows a block diagram of an example system arranged to measure pressure in a wellbore, in accordance with various embodiments.

FIG. 5 shows a block diagram of an embodiment of an example system 500 arranged to measure pressure in a wellbore 501. System 500 can include an optical source 505, an optical fiber 510, a detection unit 515, and a processing unit 520. The optical source 505, the optical fiber 510, the detection unit 515, and the processing unit 520 can be structured to perform similar to or identical to corresponding components of system 200 of FIG. 2. As shown in FIG. 5, the system 500 is arranged with the optical fiber 510 and the detection unit 515 disposed in wellbore 501 in formation 502 with the optical source 505 and the processing unit 520 on surface 504. The detection unit 515 downhole can communicate with the processing unit 520 on the surface 504 using known communication techniques for communicating in a wellbore. The optical fiber 510 can be structured with FBGs 512-1 . . . 512-T distributed along the optical fiber 510 from the surface 504 to a location downhole. The optical fiber 510 can be structured as a single optical fiber having FBGs 512-1 . . . 512-T. The optical fiber 510 can be structured as multiple optical fibers with the FBGs 512-1 . . . 512-T distributed across the multiple optical fibers.

Figure 6:
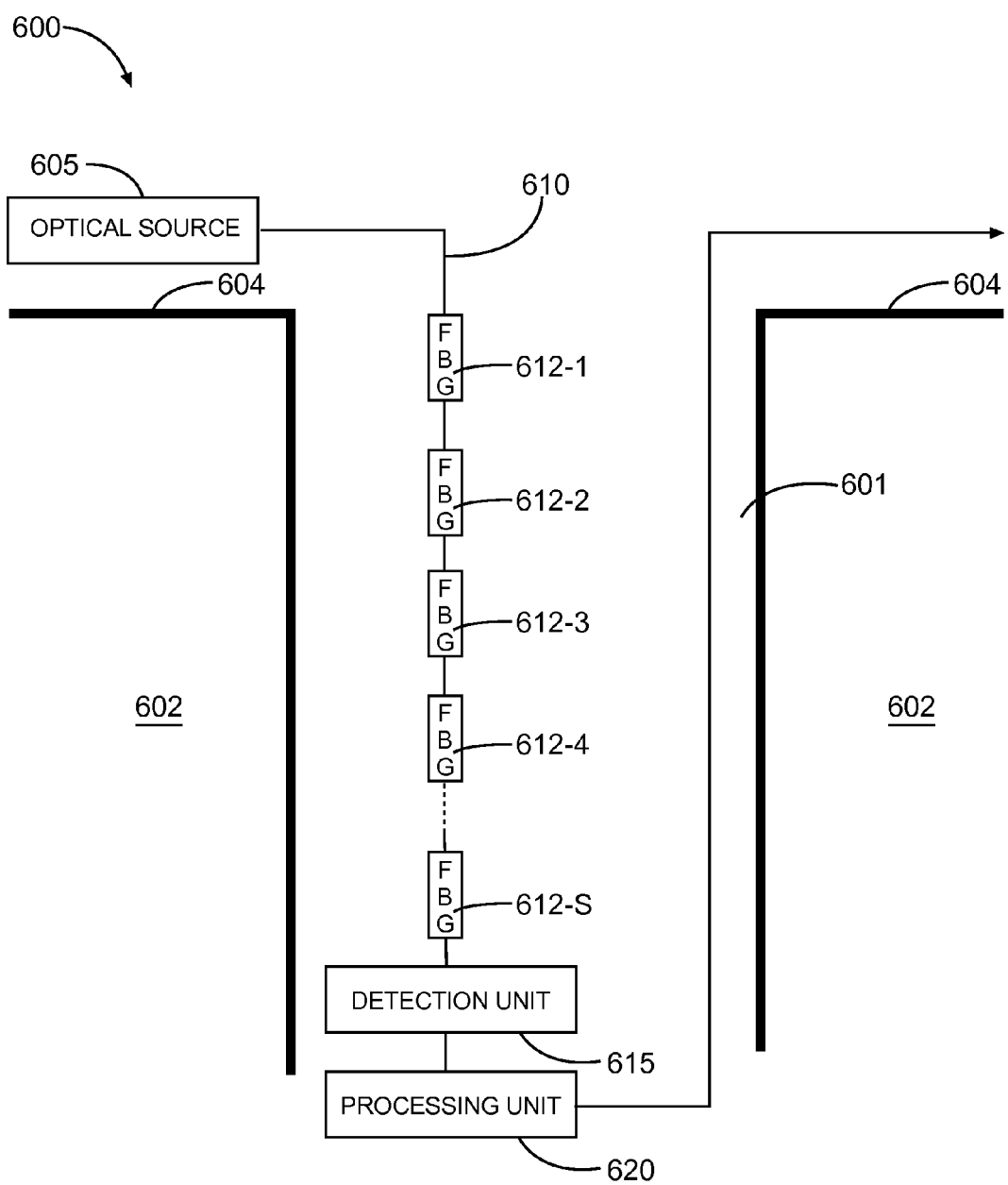
FIG. 6 shows a block diagram of an example system arranged to measure pressure in a wellbore, in accordance with various embodiments.

FIG. 6 shows a block diagram of an embodiment of an example system 600 arranged to measure pressure in a wellbore 601. System 600 can include an optical source 605, an optical fiber 610, a detection unit 615, and a processing unit 620. The optical source 605, the optical fiber 610, the detection unit 615, and the processing unit 620 can be structured to perform similar to or identical to corresponding components of system 200 of FIG. 2. As shown in FIG. 6, the system 600 is arranged with the optical fiber 610, the detection unit 615, and the processing unit 620 disposed in wellbore 601 in formation 602 with the optical source 605 on surface 604. Alternatively, the optical source 605 may be disposed in the wellbore in the arrangement of FIG. 6, as well as the arrangements of FIGS. 3-5. The processing unit 620 downhole can communicate with the surface 604 using known communication techniques for communicating in a wellbore. The optical fiber 610 can be structured with FBGs 612-1 . . . 612-S distributed along the optical fiber 610 from the surface 604 to a location downhole. The optical fiber 610 can be structured as a single optical fiber having FBGs 612-1 . . . 612-S. The optical fiber 610 can be structured as multiple optical fibers with the FBGs 612-1 . . . 612-S distributed across the multiple optical fibers.

Figure 7:
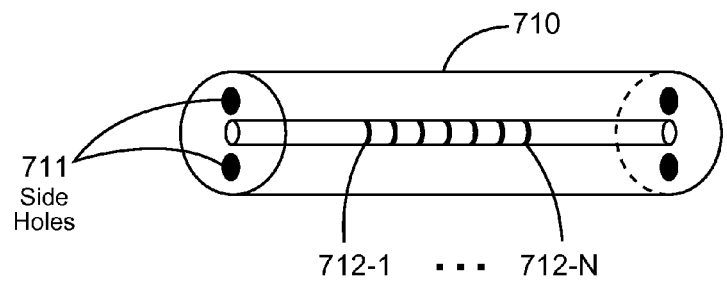
FIG. 7 shows an example polarization-maintaining fiber with two holes along the polarization-maintaining fiber, in accordance with various embodiments.

In various embodiments, a pressure sensing scheme utilizes slow light in FBGs formed on a side-hole PM fiber. FIG. 7 shows a PM fiber 710 with two holes 711 along the length (side) of the PM fiber. Side-hole PM fibers can have an asymmetric core allowing two orthogonal polarized modes to propagate in the fiber, where each mode travels at slightly different velocities, which are determined by the birefringence of the fiber. Side holes can be included in the cladding to further convert isotropic pressure into anisotropic strain on the fiber core. An FBG can be fabricated on the fiber core by UV irradiation. When hydrostatic pressure is loaded on the FBG, light at the slow-light wavelength in two orthogonally polarized modes experiences different decreases in group velocity in the two different modes, which is induced by different strain-optical coefficients. It is well know that when the propagation velocity difference of two light beams changes, the phase difference also changes. Therefore, the use of slow light in an FBG can sense pressure by measuring the phase difference between two orthogonal polarized modes.

Quasi-distributed pressure sensing can be realized by multiplexing a number of FBGs with different Bragg wavelengths and using one slow-light peak of each FBG. Different sensors are distinguished in the wavelength domain by different slow-light wavelengths. The number multiplexing sensors of this scheme may be limited by the ratio between the bandwidth of a light source and the bandwidth of each FBG.

Figure 8:
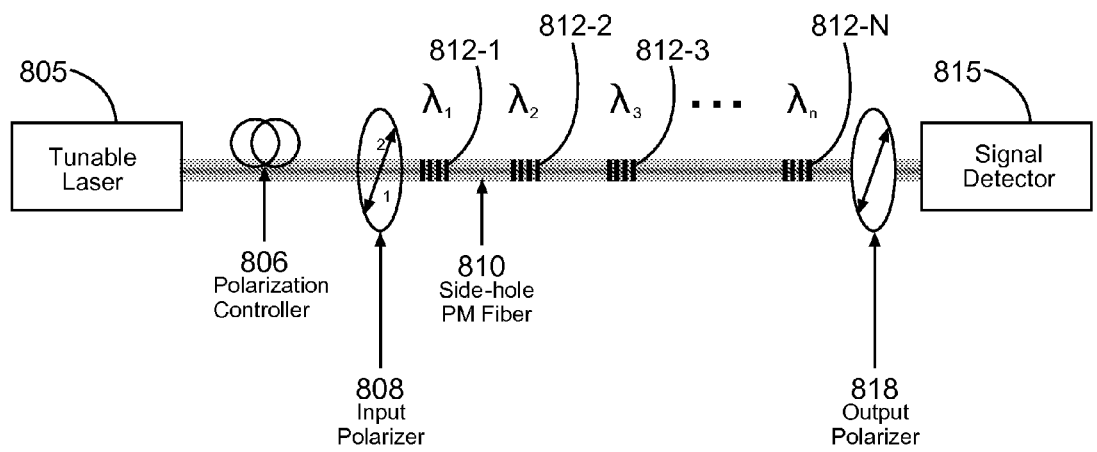
FIG. 8 shows a schematic of an interrogation system, which can be realized as a distributed pressure sensing system, in accordance with various embodiments.

FIG. 8 shows a schematic of an embodiment of an interrogation system, which can be realized as a distributed pressure sensing system. Light from a tunable laser 805 with a narrow linewidth can be used as probe light that is injected into a side-hole PM optical fiber 810. The tunable laser 805 can be tuned to the slow-light wavelength of each FBG 812-1 . . . 812-N, N being an integer greater than two, such that optical signals can be transmitted into the side-hole PM optical fiber 810 at N slow-light wavelengths, $\lambda_1 \ldots \lambda_N$, N being an integer greater than two. The tunable laser 805 and the FBGs 812-1 . . . 812-N can be structured such that the operating wavelengths of the set of optical signals include a sequence of operating wavelengths, which operating wavelength separated from the next operating wavelength in the sequence by 10 nm. Other variations of the operating wavelengths may be implemented. The tunable laser 805 may include wavelength scanning capability within a range of resolution. The range may correspond to ±25% of 100 kHz (0.1 pm). Other ranges of resolution may be used. In addition, the optical signals may be generated at different times.

A polarization controller 806 and an input linear polarizer 808 can be arranged in front of the side-hole PM fiber 810 to ensure that linear polarized light is split equally into two orthogonal polarized modes. When pressure is applied on a FBG 812-K ($1 \leq K \leq N$), the light at the slow-light wavelength of the FBG 812-K in two orthogonal polarized modes undergoes different phase change An output linear polarizer 818 can be used to generate the beat signal of the light in two orthogonal polarized modes and the intensity of the beat signal can be determined by the phase difference. One light travels faster than the other polarization state, so there is a phase delay between the two polarizations, where the delay is proportional to pressure applied on the PM fiber 810. The light in two polarization states beat at the output linear polarizer and the intensity of the beat signal is determined by the phase difference. The signal detector is used to detect the intensity of the beat signal (converting optical signal into electrical signal). The signal detector 815 can be realized including a photo-detector array. Output of the signal detector 815 can be further processed to provide distributed pressure information.

Figure 9:
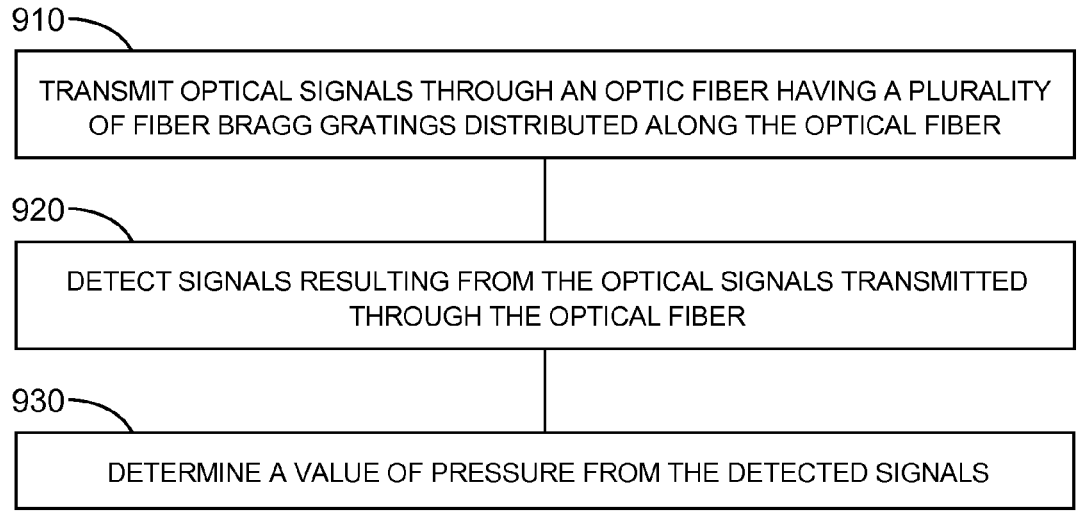
FIG. 9 shows features of an example method of measuring pressure using an optical fiber, in accordance with various embodiments.

FIG. 9 shows features of an example of an embodiment of a method of measuring pressure using an optical fiber. At 910, optical signals are transmitted through an optical fiber having a plurality of fiber Bragg gratings distributed along the optical fiber. Each fiber Bragg grating of the plurality of fiber Bragg gratings can have a Bragg wavelength different from the other fiber Bragg gratings. Each of the optical signals can have an operating wavelength different from operating wavelengths of the other optical signals, where each operating wavelength of these optical signals can be selected to be at a wavelength of a slow-light peak of a respective one of the fiber Bragg gratings. For the respective fiber Bragg grating, the selected operation wavelength can be the wavelength of the slow-light peak having the largest group index. In other words, all the wavelengths at the slow-light peaks can be used theoretically, but the slow-light peak having the largest group index (the smallest group velocity) gives the highest sensitivity compared to the other slow-light peaks. Optionally, the optical fiber may include other fiber Bragg gratings in addition to the plurality of fiber Bragg gratings, where one or more of these additional fiber Bragg gratings have a Bragg wavelength equal to that of fiber Bragg gratings of the plurality of fiber Bragg gratings. Other optical signals may be injected into the optical fiber for propagation through the optical fiber to a detection unit, including optical signals having an operating wavelength at a slow-light peak of fiber Bragg gratings of the optical fiber other than the fiber Bragg gratings of the plurality of fiber Bragg gratings.

Transmitting the optical signals through the optical fiber can include propagating two orthogonal polarized modes in the optical fiber for each of the optical signals. Propagating the two orthogonal polarized modes in the optical fiber can include using polarization elements between a source of the optical signals and an end of the optical fiber at which the optical signals are injected for transmission through the optical fiber. Transmitting the optical signals can include selectively controlling generation of the optical signals such that each optical signal is generated at a different time from the other optical signals. Transmitting the optical signals can include using a tunable laser to transmit the optical signals, where the tunable laser can be tuned to an operating wavelength of a selected slow-light peak of each respective one of the fiber Bragg gratings.

At 910, signals resulting from the optical signals transmitted through the optical fiber are detected. Detecting the signals can include using a linear polarizer at the output of the optical fiber to generate a beat signal of light in the two orthogonal polarized modes, propagated from the injection of the optical signals into the optical fiber.

At 920, a value of pressure is determined from the detected signals. The determined value can correspond to pressure at a location of one of the fiber Bragg gratings. Determining the value of pressure can include sensing the pressure by measuring the intensity of the beat signal between two orthogonal polarized modes corresponding to the location of a respective fiber Bragg grating, where the two orthogonal polarized modes for the optical signals was generated at the injection of the optical signals into the optical fiber. In addition to determining pressure at a location of one of the fiber Bragg gratings, a measurement process can include determining the value of pressure at each location corresponding to each respective fiber Bragg grating.

Transmitting optical signals through the optical fiber can include propagating the optical signals in an optical fiber disposed downhole at a well site. The optical signals can be coupled into the optical fiber from an optical source that is disposed aboveground. Detecting signals resulting from the optical signals transmitted through the optical fiber can include detecting the signals at a detector unit disposed aboveground. The detected signals can be processed at a processing unit aboveground. Alternatively, detecting signals resulting from the optical signals transmitted through the optical fiber can include detecting the signals at a detector unit disposed below ground. The signals detected below ground can be processed at a processing unit aboveground or at a processing unit below ground. The detection and processing of signals can be performed in separate units or in an integrated unit.

In various embodiments, a machine-readable storage device, such as a computer-readable storage device, has machine-executable instructions, which when executed by a controller, such as a processor, cause a measurement system to operate downhole in a well using optical signals at wavelengths of peak intensity of slow-light applied to an optical fiber having FBGs distributed along the optical fiber. These instructions provide a mechanism to control or simulate the measurement system to operate in a manner similar to or identical to systems associated with FIGS. 1-10. The machine-readable storage device is not limited to any one type of device. Further, a machine-readable storage device, herein, is a physical device that stores data represented by physical structure within the device. Machine-readable storage devices may include, but are not limited to, solid-state memories, optical devices, and magnetic devices. Examples of machine-readable storage devices include, but are not limited to, read only memory (ROM), random access memory (RAM), a magnetic disk storage device, an optical storage device, a flash memory, and other electronic, magnetic, and/or optical memory-like devices.

Figure 10:
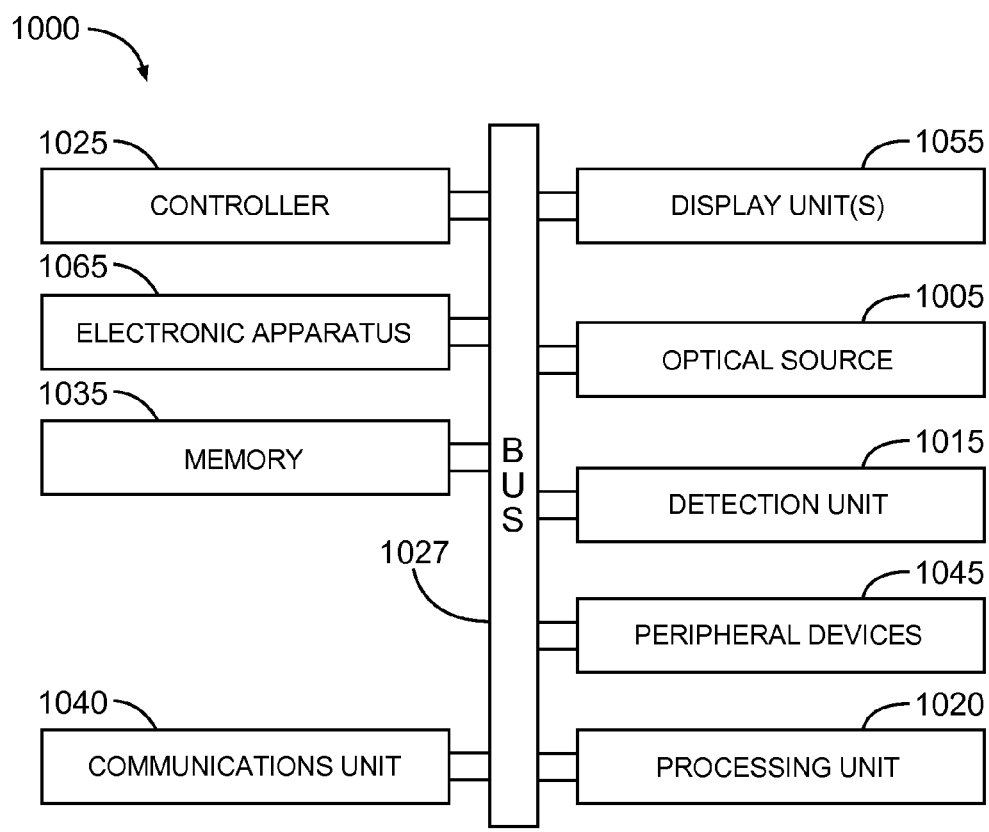
FIG. 10 depicts a block diagram of an example system that can use an optical fiber structured with fiber Bragg gratings along the optical fiber, operable downhole in a well, in accordance with various embodiments.

FIG. 10 depicts a block diagram of an example embodiment of a system 1000 that can use an optical fiber structured with FBGs along the optical fiber operable downhole in a well. The optical fiber can be arranged to receive optical signals from an optical source 1005 for transmission through the optical fiber to a detector unit 1015. Signals received at the detector unit 1015 can be operated on by processing unit 1020. The system 1000 can be structured to operate the optical source 1005, the detector unit 1015, and the processing unit 1020 with respect to the optical fiber in accordance with the teachings herein. The system 1000 can also include a controller 1025, a memory 1035, an electronic apparatus 1065, and a communications unit 1040.

The controller 1025, the memory 1035, and the communications unit 1040 can be arranged to operate as a processing unit to control operation of the optical source 1005 and the detector unit 1015, in a manner similar or identical to the procedures discussed herein. Such a processing unit may be realized using the processing unit 1020, which can be implemented as a single unit or distributed among the components of system 1000 including electronic apparatus 1065. The controller 1025 and the memory 1035 can operate to control activation of the optical source 1005 and collection of signals from the detector unit 1015. The system 1000 can be structured to function in a manner similar to or identical to structures associated with FIGS. 1-9.

The system 1000 can also include a bus 1027, where the bus 1027 provides electrical conductivity among the components of the system 1000. The bus 1027 can include an address bus, a data bus, and a control bus, each independently structured or in an integrated format. The bus 1027 can be realized using a number of different communication mediums that allows for the distribution of components of system 1000. The bus 1027 can be arranged to provide a communication medium using traditional downhole communications techniques. The communications unit 1040 can include downhole communications operable with bus 1027. Such downhole communications can include a telemetry system. Use of bus 1027 can be regulated by controller 1025.

In various embodiments, the peripheral devices 1045 can include additional storage memory and/or other control devices that may operate in conjunction with the controller 1025 and/or the memory 1035. In an embodiment, the controller 1025 can be realized as a processor or a group of processors that may operate independently depending on an assigned function. The peripheral devices 1045 can be arranged with one or more displays 1055, as a distributed component on the surface, that can be used with instructions stored in the memory 1035 to implement a user interface to monitor the operation of components distributed within the system 1000. The user interface can be used to input parameter values to operate the system 1000.

In various embodiments, systems and methods can be arranged and used, as taught herein, to use slow-light generated by FBGs in the measurement of distributed pressure. Distributed pressure measurement is highly desired in monitoring situations such as, for example, monitoring wellbore conditions. A number of FBG sensors can be multiplexed along a single fiber and share the same interrogation system, providing the ability to realize quasi-distributed measurement, which may also help to reduce the cost associated with a single sensing point. Additionally, these arrangements that utilize slow-light can be combined with side-hole fibers for the measurement of distributed pressure. Such arrangements and schemes can take utilize the fabrication processes and multiplexing of FBG sensors used in the telecom industry and sensor industry that may enable low-cost systems and processes to provide a practical sensor design.

Pressure sensing schemes, similar to or identical to schemes discussed herein, are based on a slow-light configuration, rather than implementing interrogation schemes that traditionally monitor wavelength shift of Bragg wavelength of a FBG sensor used as temperature, strain, or pressure sensor. It has been reported that the sensitivity of a strain sensor based on slow light in an FBG was approximately 730 higher than traditional methods. It is anticipated that embodiments using FBG pressure sensors may have higher sensitivity than the traditional pressure sensors. In addition, light propagating in two orthogonal polarized modes of a PM fiber, in which the FBGs are structured, view the same temperature change in the two modes, thus the accuracy of pressure measurement should not be affected by the temperature change.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
transmitting optical signals through an optical fiber having a plurality of fiber Bragg gratings distributed along the optical fiber, each fiber Bragg grating having a Bragg wavelength different from the other fiber Bragg gratings, each of the optical signals having an operating wavelength different from operating wavelengths of the other optical signals, each operating wavelength of the optical signals being at a wavelength of a slow-light peak of a respective one of the fiber Bragg gratings;
detecting signals resulting from the optical signals transmitted through the optical fiber; and
determining a value of pressure from the detected signals, the determined value corresponding to pressure at a location of one of the fiber Bragg gratings.

2. The method of claim 1, wherein transmitting the optical signals through the optical fiber includes propagating two orthogonal polarized modes in the optical fiber for each of the optical signals.

3. The method of claim 2, wherein propagating the two orthogonal polarized modes in the optical fiber includes using polarization elements between a source of the optical signals and an end of the optical fiber at which the optical signals are injected for transmission through the optical fiber.

4. The method of claim 2, wherein detecting signals includes using a linear polarizer at the output of the optical fiber to generate a beat signal of light in the two orthogonal polarized modes.

5. The method of claim 2, wherein determining the value of pressure includes sensing the pressure by measuring intensity of a beat signal between the two orthogonal polarized modes corresponding to the location.

6. The method of claim 1, wherein the method includes determining the value of pressure at each location corresponding to each respective fiber Bragg grating.

7. The method of claim 1, wherein transmitting the optical signals through the optical fiber includes transmitting the optical signals through a polarization-maintaining optical fiber including a cladding having side-holes in the cladding.

8. The method of claim 1, wherein transmitting the optical signals includes using a tunable laser to transmit the optical signals, the tunable laser being tuned to a wavelength of a selected slow-light peak of each respective one of the fiber Bragg gratings.

9. The method of claim 1, wherein transmitting the optical signals includes selectively controlling generation of the optical signals such that each optical signal is generated at a different time from the other optical signals.

10. The method of claim 1, wherein transmitting optical signals through the optical fiber includes propagating the optical signals in an optical fiber disposed downhole at a well site, the optical signals coupled into the optical fiber from an optical source disposed aboveground.

11. The method of claim 10, wherein detecting signals resulting from the optical signals transmitted through the optical fiber includes detecting the signals at a detector unit disposed aboveground.

12. A system comprising:
an optical fiber having a plurality of fiber Bragg gratings distributed along the optical fiber, each fiber Bragg grating having a Bragg wavelength different from the other fiber Bragg gratings;
an optical source operatively coupled to the optical fiber and arranged to operatively transmit optical signals through the optical fiber, each of the optical signals having an operating wavelength different from operating wavelengths of the other optical signals, each operating wavelength of the optical signals being at a wavelength of a slow-light peak of a respective one of the fiber Bragg gratings;
a detector unit operatively coupled to the optical fiber to detect signals resulting from the optical signals transmitted through the optical fiber;
a processing unit operatively coupled to the detector unit and arranged to determine a value of pressure from the detected signals, the determined value corresponding to pressure at a location of one of the fiber Bragg gratings.

13. The system of claim 12, wherein the optical fiber is a polarization-maintaining fiber.

14. The system of claim 13, wherein the polarization-maintaining fiber includes a cladding having holes that extend along the optical fiber.

15. The system of claim 13, wherein the system includes polarization elements between the optical source and an end of the optical fiber at which the optical signals are injected into the optical fiber.

16. The system of claim 15, wherein the polarization elements are arranged to provide linear polarized light split equally into two orthogonal polarized modes.

17. The system of claim 16, wherein the polarization elements include a polarization controller and an input linear polarizer.

18. The system of claim 12, wherein the system includes an output polarizer arranged between the optical fiber and the detector unit.

19. The system of claim 12, wherein the detector unit includes a photo-detector array.

20. The system of claim 12, wherein the optical source includes a tunable laser.

* * * * *